United States Patent [19]

Adams et al.

[11] Patent Number: 4,763,731

[45] Date of Patent: Aug. 16, 1988

[54] FIRE SUPPRESSION SYSTEM FOR AIRCRAFT

[75] Inventors: Robert E. Adams, Mercer Island; A. Fredric Grenich, Kent; Frederick F. Tolle, Issaquah, all of Wash.

[73] Assignee: The Boeing Company, Seattle, Wash.

[21] Appl. No.: 767,653

[22] Filed: Aug. 20, 1985

Related U.S. Application Data

[63] Continuation of Ser. No. 536,690, Sep. 28, 1983, abandoned.

[51] Int. Cl.$^4$ ............................................. A62C 3/08
[52] U.S. Cl. ........................................ 169/46; 169/26; 169/62
[58] Field of Search ..................... 169/36, 46, 52, 53, 169/26, 62; 89/34, 36 H

[56] References Cited

U.S. PATENT DOCUMENTS

| | | | |
|---|---|---|---|
| T861,043 | 4/1969 | Gross et al. | 169/26 X |
| 2,917,116 | 11/1959 | Wyant | 169/36 X |
| 3,782,476 | 1/1974 | Leach | 169/46 |
| 3,930,541 | 1/1976 | Bowman et al. | 89/36 H X |
| 4,132,271 | 1/1979 | Mikaila | 89/36 H X |
| 4,251,579 | 2/1981 | Lee et al. | 169/26 X |
| 4,262,749 | 4/1981 | Monte | 89/36 H X |
| 4,276,939 | 7/1981 | Klimenko et al. | 169/26 X |

*Primary Examiner*—Andres Kashnikow
*Assistant Examiner*—Kevin Patrick Weldon
*Attorney, Agent, or Firm*—Joan H. Pauly

[57] ABSTRACT

A dry bay (4) in an aircraft wing (2) is filled with a large number of relatively small, preferably spherical, containers (12). Sealed inside each container (12) is a non-corrosive gaseous fire extinguishant (14). A number of containers (12) are opened by being broken by an impact force or melted or burst by the heat of a fire. Extinguishant (14) is released from the opened containers (12) to suppress a fire. The packing density of containers (12) in dry bay (4) may be varied by varying the size and/or shape of containers (12). Containers (12) may be introduced into dry bay (4) by pressure injection or by gravity. Containers (12) may be removed from dry bay (4) to allow maintenance and repair activities by allowing containers (12) to drop out of dry bay (4) into a suitable receptacle or by drawing containers (12) out of dry bay (4) with a vacuum powered device.

2 Claims, 1 Drawing Sheet

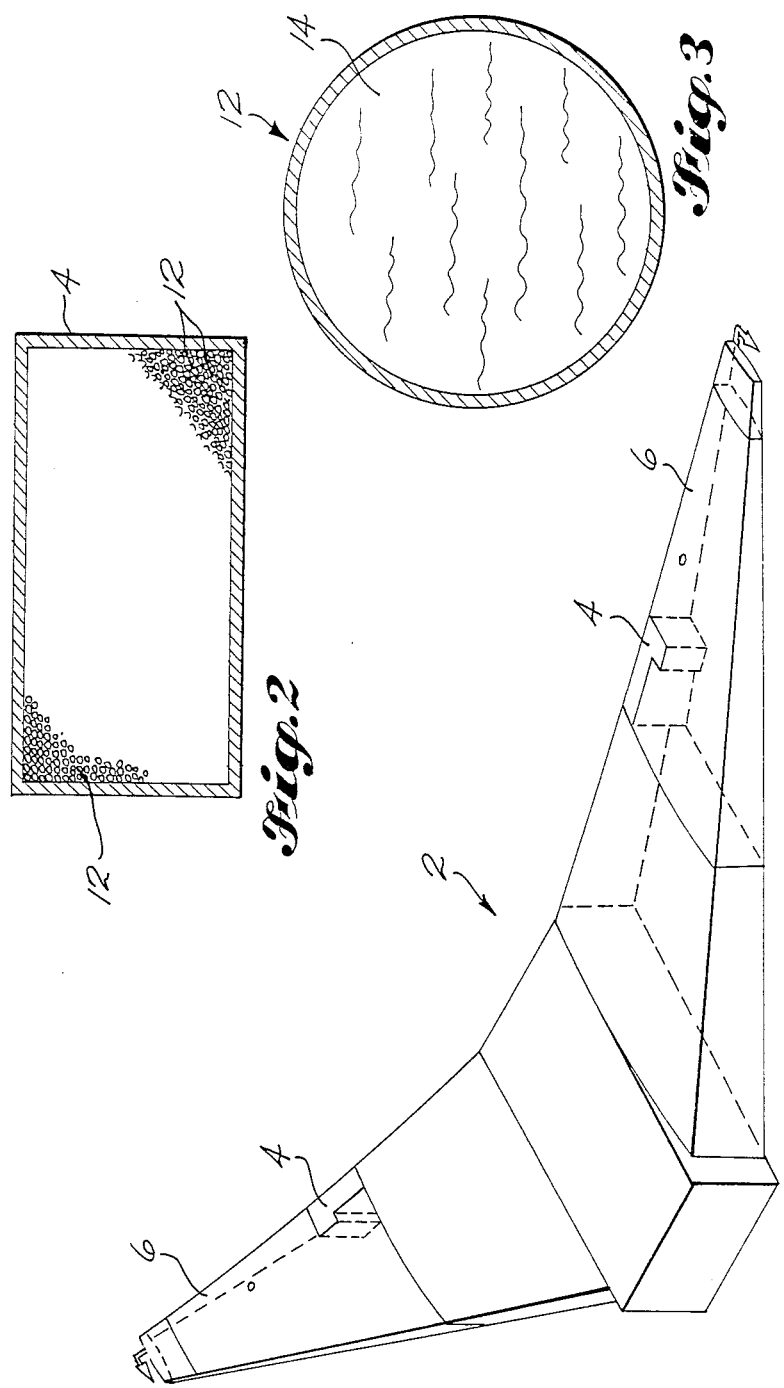

FIRE SUPPRESSION SYSTEM FOR AIRCRAFT

This application is a continuation of application Ser. No. 536,690, filed Sept. 28, 1983 and now abandoned.

DESCRIPTION

1. Technical Field

This invention relates to fire suppression systems and, more particularly, to such a system for use in an aircraft that is passive and that does not create any corrosion or maintenance problems.

2. Background Art

A compartment in an aircraft that is adjacent to a fuel tank, that contains conduits or receptacles for a combustible fluid or that contains other combustible materials is subject to a high risk of fire if damage to the aircraft or equipment failure should cause damage to the compartment or its contents or leakage of combustible fluid, such as fuel or fuel vapors, into the compartment. The leaking fluid or other combustible material might be ignited, for example, by an ignition source normally present in the compartment, such as a high temperature component, by electrical arcing due to an electrical failure, by the intrusion of a high temperature engine part caused by engine failure, or by an incendiary projectile entering the compartment during combat. The desirability of suppressing any fire that might result from such damage and/or leakage and ignition is obvious. In order to maximize the effectiveness of the fire suppression, it is also desirable that a fire suppression system be provided which requires no human intervention and which is activated during an early stage of the fire.

A number of approaches to providing a fire suppression system for use in areas of an aircraft in which the above-described type of fire hazard exists have been proposed and considered. These approaches include passive systems in which no detection equipment is required and active systems which require detection equipment to detect the fire and produce a signal that will activate the system and discharge a fire extinguishant. An example of a proposed passive system is the provision of passive powder packs lining the walls of the compartment. This system is activated when a powder pack is ruptured and the powdered fire extinguishant inside the pack is spread around the compartment. The powder flies out of the powder pack in all directions around the compartment. This system has at least three serious drawbacks. First, the powder spreads all over the compartment and is very difficult to clean up. Second, the fire extinguishant powders currently known tend to be corrosive and thus to cause damage to the interior of the compartment and its contents. Third, the system requires that a pack be ruptured by a projectile and, thus, does not work in some situations, such as the outbreak of fire due to internal equipment failure.

Another system that has been proposed is an active system in which a fire extinguishant in the form of a halogenated hydrocarbon, such as the extinguishants sold under the name Halon, is discharged when a fire is detected. This system has the disadvantage of requiring fairly sophisticated electronic detection equipment. Such equipment greatly increases the cost of the system. The equipment is also subject to malfunctions that could prevent the proper discharge of the fire extinguishant and thereby hamper or defeat the fire suppression function of the system.

DISCLOSURE OF THE INVENTION

A subject of this invention is a method of suppressing fires in an aircraft. According to a basic aspect of the invention, the method comprises filling a plurality of small containers with a fire extinguishant and sealing the extinguishant inside the containers. A compartment of the aircraft in which there is a risk of fire is filled with the extinguishant-filled containers. A hazardous force is allowed to open a number of the containers to release the fire extinguishant and suppress a fire. The release of the fire extinguishant may be a result of an impact force breaking a number of the containers, or it may occur as a result of the heat of a fire melting or bursting a number of the containers.

The step of filling the compartment may be carried out in various ways. One alternative is to use pressure to inject the containers into the compartment. Another alternative is to release the containers over an opening in an upper portion of the compartment and to allow the action of gravity to cause the containers to drop into and fill the compartment.

The method preferably further comprises removing the containers from the compartment to permit maintenance activity and the like and refilling the compartment with the containers when such activity is completed. The step of removing the containers may be carried out in various ways. One alternative is to draw the containers out of the compartment with a vacuum powered device. Another alternative is to open a panel in a lower portion of the compartment and allow the action of gravity to cause the containers to drop out of the compartment.

According to an aspect of the invention, the method further comprises controlling the packing density of the containers in the compartment by varying the shape of the containers. According to another aspect of the invention, the method further comprises controlling the packing density of the containers in the compartment by varying the size of the containers.

Another subject of the invention is fire suppression apparatus in an aircraft in combination with a body of combustible fluid, wall means confining said body of fluid, and a compartment having an interior space adjacent to said wall means. Still another subject of the invention is fire suppression apparatus in an aircraft in combination with a compartment having an interior space and a combustible material located in said interior space. According to an aspect of the invention, the fire suppression apparatus in either combination comprises a plurality of containers essentially filling said interior space and a fire extinguishant sealed inside each container. The containers are sufficiently small to permit their easy introduction into and removal from the interior space through available access openings, and to permit a body of the containers to substantially conform to the shape of the interior space. The containers are sufficiently brittle to break when subjected to an impact force of a predetermined magnitude. Preferably, the containers are essentially spherical. In the preferred embodiment, the containers are essentially the size and shape of table tennis balls.

The fire suppression apparatus may include a number of preferred features. One such feature is containers that are made from a material that melts when subjected to a predetermined temperature or that bursts when the containers and the extinquishant sealed inside are subjected to a predetermined temperature. Other preferred features include the use of a fire extinguishant that is noncorrosive and the use of a gaseous fire extinguishant.

The present invention solves the problem of providing an effective fire suppression system for aircraft compartments in which the above-described fire hazards exist. The method of the invention has the advantages of not requiring any human intervention and of being automatically activated so that no electronic or other equipment is necessary to detect a fire. The method of the invention also has the significant advantage of readily lending itself to the use of gaseous fire extinguishants that will not present any cleanup problem and that are noncorrosive. By use of the method of the invention, an aircraft compartment in which there is a fire hazard may be essentially filled with a fire extinguishant without adding a significant amount of weight to the aircraft (especially when a gaseous extinguishant is used) and without creating any maintenance problems. Whether or not any of the extinguishant has been released, the compartment may easily be cleared of the containers in order to carry out routine maintenance and/or damage repair and may easily be refilled when the aircraft is put back into operation.

The fire suppression system of the invention is very efficient. If during use of the aircraft the compartment is damaged and fire extinguishant is released, the release of the extinguishant will be centered around the damaged area of the compartment where the threat of fire is greatest. If extinguishant is released by melting or bursting of some containers, the release of extinguishant will be centered around the area of the fire. In either case, the effectiveness of a given amount of fire extinguishant is maximized and the system is activated during an early stage of the fire before it affects a large area.

The cost of the materials and labor necessary to provide the apparatus of the invention and to carry out the method of the invention are minimal and thus the invention provides a low cost but effective and efficient system for suppressing fires in aircraft. In the preferred embodiment, the system may be activated by either an impact force or heat and, thus, the system is effective in a large number of situations, whether or not a projectile penetrates the compartment. The system is easy to implement and does not include any complicated operations or sophisticated equipment. Therefore, the chances of failure of the system due to human error or equipment malfunction are negligible and the system is extremely reliable.

These and other advantages and features will become apparent from the detailed description of the best mode for carrying out the invention that follows.

BRIEF DESCRIPTION OF THE DRAWINGS

In the drawings, like element designations refer to like parts throughout, and:

FIG. 1 is a simplified pictorial view of the wing fuel tanks and dry bays of a jet aircraft.

FIG. 2 is a vertical sectional view of one of the dry bays shown in FIG. 1 filled with containers constructed in accordance with the preferred embodiment of the invention.

FIG. 3 is an enlarged sectional view of one-half of one of the containers shown in FIG. 2.

BEST MODE FOR CARRYING OUT THE INVENTION

The drawings show a dry bay (an interior space in an aircraft into which a combustible fluid could leak as a result of damage to the aircraft or equipment failure) that is provided with a fire suppression system in accordance with the preferred embodiment of the system of the present invention. The dry bay illustrated is a compartment 4 adjacent to a fuel tank 6 in the wing 2 of a jet aircraft. The compartment 4 is only one example of a location in which the system of the invention may be used to great advantage. Other examples include normally dry interior spaces through which fuel lines or conduits for combustible hydraulic fluid extend and compartments containing combustible materials, such as insulation. The system of the invention may be used to advantage in connection with any aircraft interior space in which a combustible material is located or into which there is a risk of leakage of combustible fluid.

The method of the invention comprises filling a large number of containers with a fire extinguishant and sealing the extinguishant inside the containers. The drawings show the preferred form of the containers 12. Each container 12 is small relative to the size of the compartment 4 in order to allow a large number of containers 12 to be placed in the compartment 4, to allow easy filling and emptying of the compartment 4 through available access openings, and to maximize the conformity of the body of containers to the shape of the compartment 4. The preferred shape for the containers 12 is essentially spherical to minmize empty space in the compartment 4 and further maximize the conformity to the shape of the compartment 4. Spherical containers 12 also have the advantage of being readily loadable into the compartment by being blown or dropped in by gravity. Evacuation of the compartment 4 is also facilitated by the use of spherical containers. The size and construction of the containers 12 in the preferred embodiment of the invention are very similar to the size and construction of a table tennis ball.

The containers 12 may be made from a variety of materials. Suitable materials include various kinds of plastic, metal, composites and other tough materials. The skin of the containers 12 must be sufficiently brittle to break when subjected to an impact force of a predetermined magnitude (such as the expected minimum force of a projectile) but sufficiently strong to withstand pressure changes within the aircraft. Such pressure changes are generally within the order of from 15 pounds per square inch to 3 pounds per square inch. (The extinguishant 14 is preferably a little above atmospheric pressure.) In the preferred embodiment, the material is also required to melt or burst at or below the ignition temperature of any combustible material located in the compartment or any combustible fluid that could leak into the compartment. In all embodiments, the selection of the material for forming the containers is also influenced by the always present need to minimize the weight of the aircraft.

The fire extinguishant 14 may also be provided in a number of forms. A powdered extinguishant may be used, but a gaseous extinguishant is preferred to minimize weight. Examples of suitable gaseous extinguishants are a halogenated hydrocarbon, such as the extinguishants sold under the name Halon, nitrogen, and carbon dioxide. Each of these gaseous agents has the desirable characteristics of being noncorrosive and of not presenting any cleanup problem if the agent is dispersed in the compartment.

In carrying out the method of the invention, the containers 12 filled with the extinguishant 14 are placed in the compartment 4 to fill the compartment 4. This filling of the compartment 4 with the containers 12 may be carried out by a number of means. When there is an opening in an upper portion of the compartment 4, the containers 12 may be loaded into the compartment 4 simply by releasing the containers 12 over the opening and allowing the action of gravity to cause the containers 12 to drop into and fill the compartment 4. An alternative means of filling the compartment 4 with the containers 12 is to use pressure to inject the containers 12 into the compartment 4. This second way of filling the compartment 4 has the advantages of maxmizing the speed of the operation and of being easily accomplished in the case of a compartment which has no suitable opening for gravity loading or in which the opening is not easily accessible. The first described way of filling the compartment 4 has the advantage of being very versatile and requiring a minimum amount of equipment.

However the filling operation is carried out, the packing density of the containers 12 in the compartment 4 may be controlled by varying the size and/or shape of the containers 12. In most situations, it would be desirable to maximize the packing density to provide a maximum amount of fire extinguishant 14 and to maximize the number of containers 12 subject to an impact force or the heat of a fire. The desired maximization of the packing density is accomplished in the preferred embodiment of the invention by providing the containers 12 in the form of table tennis ball size spheres.

According to the invention, an aircraft compartment such as the compartment 4 shown in the drawings is provided with an automatic fire suppression system to protect the compartment and the aircraft against fire caused by damage to the compartment or equipment failure. Examples of situations in which a leaking combustible fluid or other combustible material might be ignited are set forth above. When damage to the compartment 4 occurs and one or more projectiles are propelled into the compartment 4, the method of the invention allows the impact force of the projectiles to break open a number of the containers 12 at or near the damage site. When the containers 12 break, the fire extinguishant 14 inside the containers 12 is released to suppress any fire in the vicinity of the damage site. This dispersal of the fire extinguishant 14 at the damage site insures that the extinguishant 14 will be concentrated around the damage site where the threat of fire is greatest. In the preferred embodiment of the invention, when there are no projectiles entering the compartment 4 and no impact force sufficient to break the containers 12, a number of the containers 12 in the vicinity of any outbreak of fire will melt or burst to release the extinguishant 14 and suppress the fire. In either case (breaking by impact force or melting or bursting by heat), the containers 12 are opened and extinguishant 14 is released at an early stage of the fire so that successful suppression is highly probable and fire damage is minimized.

Compartments such as the compartment 4 generally require routine access in order to carry out maintenance activity. Access to such compartments must of course also be available following damage to the compartment in order to repair the damage. In either case, it is highly desirable that any fire suppression system provided not impede quick and easy access to the compartment.

A great advantage of the present invention is that access to the compartment 4 may be easily obtained by removing the containers 12 from the compartment 4. The compartment 4 may be emptied of the containers 12 by opening a door or panel in a lower portion of the compartment 4 and allowing the action of gravity to cause the containers 12 to drop out of the compartment 4. The containers 12 may be dropped into any convenient receptacle for temporary storage while the maintenance or repair activity is being carried out. An alternative way of removing the containers 12 is employing a vacuum powered device to draw the contrainers 12 out of the compartment 4. Again, the containers 12 may be temporarily stored in any convenient receptacle while the maintenance and/or repair activity is being accomplished. This second way of removing the containers 12 has the advantages of providing quick removal and of maxmizing the completeness of the removal. The first described way of removing the containers 12 has the advantages of ease and simplicity. After the maintenance and/or repair activity has been completed and it is desired to put the aircraft back into operation, the compartment 4 may be refilled in the same manner described above for the initial filling of the compartment 4.

It will be obvious to those skilled in the art to which this invention is addressed that the invention may be used to advantage in a variety of situations. Therefore, it is also to be understood by those skilled in the art that various changes, modifications, and omissions in form and detail may be made without departing from the spirit and scope of the present invention as defined by the following claims.

What is claimed is:

1. A method of providing a compartment of an aircraft with fire protection and of minimizing the effect of fire suppression apparatus on maintenance and repair of the compartment, said compartment being bounded by wall means that define a normally dry interior space in which a dry combustible material is located or into which a combustible fluid could leak as a result of damage to the aircraft or equipment failure, and to which routine quick and easy access is required in order to carry out routine maintenance activity, said method comprising:

filling a plurality of discrete small containers with a fire extinguishant and sealing the extinguishant inside the containers;

filling said interior space with the extinguishant-filled containers, including allowing the discrete containers to form a body of containers that substantially conforms to the shape of such interior space; each of said containers being openable by an increase in temperature to a predetermined level to release the fire extinguishant into said interior space of said compartment in response to said increase, and each of said containers being openable by an impact force of a predetermined magnitude to release the fire extinguishant into said interior space of said compartment in response to said force; and removing said containers from said space to permit routine maintenance activity, and refilling said space with said containers when such activity is completed.

2. A method of providing a compartment of an aircraft with fire protection and of minimizing the effect of fire suppression apparatus on maintenance and repair of the compartment, said compartment being bounded by wall means that defines a normally dry interior space in which a dry combustible material is located or into which a combustible fluid could leak as a result of damage to the aircraft or equipment failure, to which routine quick and easy access is required in order to carry out routine maintenance activity, and, when damage to the compartment occurs, to which access is required in order to carry out damage repair, said method comprising:

filling a plurality of discrete small containers with a fire extinguishant and sealing the extinguishant inside the containers;

filling said interior space with the extinguishant-filled containers, including allowing the discrete containers to form a body of containers that substantially conforms to the shape of such interior space; each of said containers being openable by an increase in temperature to a predetermined level to release the fire extinguishant into said interior space of said compartment in response to said increase, and each of said containers being openable by an impact force of a predetermined magnitude to release the fire extinguishant into said interior space of said compartment in response to said force; and when damage to the compartment has occurred, removing said containers from said space to permit repair of said damage, and refilling said space with said containers after said repair has been completed.

when damage to the compartment has occurred, removing said containers from said space to permit repair of said damage, and refilling said space with said containers after said repair has been completed.

* * * * *

UNITED STATES PATENT AND TRADEMARK OFFICE
CERTIFICATE OF CORRECTION

PATENT NO. : 4,763,731
DATED : August 16, 1988
INVENTOR(S) : R. E. Adams, A. F. Grenich & F. F. Tolle It is certified that error appears in the above-identified patent and that said Letters Patent are hereby corrected as shown below:

Column 4, line 27, "minmize" should be -- minimize --.

Column 5, line 11, "maxmizing" should be -- maximizing --.

Column 6, line 14, "maxmizing" should be -- maximizing --.

Column 8, the last paragraph should be deleted.

Signed and Sealed this

Fourth Day of April, 1989

Attest:

DONALD J. QUIGG

*Attesting Officer*  *Commissioner of Patents and Trademarks*